(12) United States Patent
Maryamchik et al.

(10) Patent No.: US 6,454,824 B1
(45) Date of Patent: Sep. 24, 2002

(54) CFB IMPACT TYPE PARTICLE COLLECTION ELEMENTS ATTACHED TO COOLED SUPPORTS

(75) Inventors: Mikhail Maryamchik, Copley Township, Summit County, OH (US); Kiplin C. Alexander, Wadsworth, OH (US); Felix Belin, Brecksville, OH (US); David R. Gibbs, Pleasant Township, Fairfield County, OH (US); David J. Walker, Wadsworth, OH (US); Donald L. Wietzke, Carlsbad, CA (US)

(73) Assignee: The Babcock & Wilcox Company, New Orleans, LA (US)

( * ) Notice: Subject to any disclaimer, the term of this patent is extended or adjusted under 35 U.S.C. 154(b) by 0 days.

(21) Appl. No.: 09/865,332

(22) Filed: May 25, 2001

(51) Int. Cl.[7] ............................................. B01D 45/08
(52) U.S. Cl. ........................ 55/434.4; 55/444; 110/216; 122/4 D
(58) Field of Search ........................... 55/434.2, 434.3, 55/434.4, 444; 96/150; 95/108; 110/216; 122/4 D

(56) References Cited

U.S. PATENT DOCUMENTS

| | | |
|---|---|---|
| 4,891,052 A | 1/1990 | Belin et al. |
| 4,951,611 A | 8/1990 | Abdulally et al. |
| 4,992,085 A | 2/1991 | Belin et al. |
| 5,025,755 A | 6/1991 | Eickvonder et al. |
| 5,064,621 A * | 11/1991 | Uyama et al. ............... 422/144 |
| 5,243,801 A | 9/1993 | Aiken et al. |
| 5,343,830 A | 9/1994 | Alexander et al. |
| 5,435,820 A | 7/1995 | Daum et al. |
| 5,799,593 A | 9/1998 | Belin et al. |
| 5,809,940 A | 9/1998 | James et al. |
| 6,095,095 A | 8/2000 | Alexander et al. |
| 6,322,603 B1 * | 11/2001 | Walker ........................ 110/216 |

FOREIGN PATENT DOCUMENTS

| | | |
|---|---|---|
| WO | WO00/68615 A1 | 11/2000 |

* cited by examiner

Primary Examiner—Robert A. Hopkins
(74) Attorney, Agent, or Firm—Eric Marich

(57) ABSTRACT

Apparatus for separating solids from flue gas in a circulating fluidized bed (CFB) boiler comprises plural vertical, impact type particle separators located within the CFB in a plurality of staggered rows. The impact type particle separators employ hung elements supported from fluid-cooled tubes which form a collecting channel, typically U-shaped, which separates particles from flue gases conveyed across the particle separators. By separating the support function from the collection shape required by functional performance considerations, the strength requirements of the material used to form the collection shape are reduced and the strength of the material from which the fluid-cooled support is made is much higher due to the lower operating temperature of the material comprising the fluid-cooled support, thereby permitting the use of lower cost materials.

17 Claims, 14 Drawing Sheets

CFB IMPACT TYPE PARTICLE COLLECTION ELEMENTS ATTACHED TO COOLED SUPPORTS

FIELD AND BACKGROUND OF THE INVENTION

The present invention relates, in general, to the field of circulating fluidized bed (CFB) boilers and, in particular, to improved impact type particle separator constructions comprising fluid-cooled tubes.

CFB boiler systems are known and used in the production of steam for industrial processes and/or electric power generation. See, for example, U.S. Pat. Nos. 5,799,593, 4,992,085, and 4,891,052 to Belin et al.; U.S. Pat. No. 5,809,940 to James et al.; U.S. Pat. Nos. 5,378,253 and 5,435,820 to Daum et al.; and U.S. Pat. No. 5,343,830 to Alexander et al. In CFB reactors, reacting and non-reacting solids are entrained within the reactor enclosure by the upward gas flow which carries solids to the exit at the upper portion of the reactor where the solids are separated by impact type particle separators. The impact type particle separators are placed in staggered arrays to present a path which may be navigated by the gas stream, but not the entrained particles. The collected solids are returned to the bottom of the reactor. One CFB boiler arrangement uses a plurality of impact type particle separators (or concave impingement members or U-beams) at the furnace exit to separate particles from the flue gas. While these separators can have a variety of configurations, they are commonly referred to as U-beams because they most often have a U-shaped configuration in cross-section.

When applied to a CFB boiler, a plurality of such impact type particle separators are supported within the furnace enclosure and extend vertically in at least two rows across the furnace exit opening, with collected particles falling unobstructed and unchanneled underneath the collecting members along the rear enclosure wall. The gap between each adjacent pair of U-beams in one row is aligned with a U-beam in a preceding or following row of U-beams to present a tortuous path for the flue gas/solids to navigate. The U-beams in each row collect and remove particles from the flow of flue gas/solids, while the flue gas stream continues to flow around and through the U-beam array.

These types of collection elements are generally relatively long in comparison to their width and depth. The shape of the collection elements is usually dictated by two considerations: namely, the collection efficiency of the U-beams themselves and the ability of the U-beams to be self-supporting. When these elements are used, they are generally placed at the furnace exit and not cooled. Their placement at the furnace outlet is to protect the downstream heating surfaces from erosion by solid particles. Thus, the U-beams are exposed to the high temperatures of the flowing stream of flue gas/solids, and the materials used for the U-beams must be sufficiently temperature resistant to provide adequate support and resistance to damage.

Long, self-supporting stainless steel plate channels have been successfully used in CFB boilers for the primary solids collector, but the "creep" strength of the commercially available and suitable alloys limits the length of the collection elements. By breaking up the long collection channel into short segments, the required strength of each short segment is much less than for the long channel due to the series of intermittent supports and the small amount of weight of any individual segment or element.

Methods of making collection elements which are cooled or supported off a cooled structure have usually included collection plates welded to water cooled support tubes. See U.S. Pat. Nos. 5,378,253 and 5,435,820 to Daum et al. However, welding to the cooling tubes increases the opportunity for tube leaks to occur at the welds.

In addition, under this known design structure, the collection element is cooled asymmetrically due to the proximity of the cooled tube or tubes to only some portion of the shaped collection channel segment or element. Thus, the plate forming the collection elements will tend to distort due to the differential expansion of the cooler areas in comparison to the hotter portions of the collection elements.

In addition, it is necessary to protect the tubes themselves from erosion caused by the impacting solids entrained within the solid/gas flow. This protection requires the use of tube shields made of stainless steel or ceramic which must be used along the entire height of the collector, which adds further cost.

SUMMARY OF THE INVENTION

The present invention comprises various arrangements and configurations of impact type particle separators, commonly provided in a U-shape, but which can also be formed into W-, E-, V- or other shapes, which are supported by fluid-cooled tubes. Such impact type particle separators find particular use in circulating fluidized bed (CFB) boilers or reactors. The present invention separates the support function from the collection shape required by functional performance considerations, thereby reducing the strength requirements of the material used to form the collection shape. By this approach, the strength of the material from which the fluidcooled support is made is much higher due to the lower operating temperature of the material comprising the fluid-cooled support, thereby permitting the use of lower cost materials for the fluid-cooled support. In addition, by using relatively small segments to make up the functional shape of each overall impact type particle separator, the strength requirements for each segment is minimal since each collection element segment needs to support only itself.

The fluid-cooled supports generally comprise tubes cooled by a fluid such as water, steam, or other suitable cooling mediums and which are positioned in the flue gas and solids particles stream. Each collection element may be supported by a single fluid-cooled tube, or as illustrated in some embodiments, two or more fluid-cooled tubes may be used, attached to maintain their relative position with respect to each other. The segments forming the collection elements may be attached directly to the one or more fluid-cooled tubes, or they may be attached to attachments to the one or more tubes, such as by using bolts or interlocking attachments such as lugs and hooks.

If desired, the collection element segments can be attached to the fluid-cooled support in such a way as to enhance cooling of the segment if that is advantageous, such as by embedding the segments in a heat conducting cement or grout. Alternatively, the segment can be spaced off or away from the fluid-cooled support by a small gap to maintain the operating temperature of the segment close to the temperature of the surrounding flue gas and solids particles, if that is desirable. This provides for controlling the temperature of the collection element segments to promote greater resistance to corrosion and/or erosion. Sometimes U-bolts, threaded studs, welded lugs on the fluid-cooled support with hooks on the segment are used to attach the collection element segments to the fluid-cooled support. Materials for the cooled support may include carbon steel or more expensive materials such as chromium-molybdenum alloys as required for the operating service temperatures. The collection element segments comprising the impact type particle separators may be made of carbon steel, alloy steel, stainless steel, ceramics, composites, or other materials as required for the intended service conditions.

Accordingly, one aspect of the present invention is drawn to an apparatus for separating solids from a flow of flue gas in a circulating fluidized bed (CFB) boiler. In all embodiments, the apparatus comprises a plurality of vertical, impact type particle separators located within the CFB, the impact type particle separators being adjacently positioned and horizontally spaced from one another in a plurality of staggered rows. Also, each impact type particle separator includes at least one vertical fluid-cooled support tube for conveying a cooling medium therethrough and a plurality of hung elements which are supported from the at least one support tube, the plurality of hung elements cooperating with one another at adjacent ends thereof to form a collecting channel which opens toward the flow of flue gas along the length of the support tube.

The difference between the various embodiments primarily involve the constructions of the impact type particle separator elements making up the array in the CFB.

In a first embodiment, each support tube has fins and the hung elements are U-shaped having side walls and a back wall and are supported by hooks attached thereto which engage the fins from a rear side of the support tube. Each support tube is located within the U-shaped portion of the hung elements, and a C-channel having interlocking portions which engage the fins from a front side of the support tube is provided, the C-channel covering the support tube to prevent erosion thereof by solids collected by the impact type particle separator when the CFB boiler is in operation.

Alternatively, or in addition to the aforementioned protective element construction, each of the support tubes may be provided with at least one of: a plurality of pin studs welded to the support tube and covered with a coating of refractory; ceramic tiles; metal or ceramic spray coatings; metal or ceramic castings; weld overlay; and shields.

In another embodiment, each of the support tubes has fins and the hung elements are U-shaped and supported by hooks which engage the fins from a front side of the support tube. Again, the plurality of hung elements cooperate with one another at adjacent ends thereof to form the collecting channel which opens toward the flow of flue gas along the length of the support tube. Here, the collecting channel has side walls and a back wall, the back wall having a curved portion adapted to correspond to an outside diameter of the support tube, the support tube being located outside of the U-shaped portion of the hung elements.

In another embodiment, each hung element of the apparatus has a first V-shaped portion and a second V-shaped portion connected thereto which together surround the support tube and cooperate with one another at adjacent ends of the hung elements to provide the collecting channel which opens toward the flow of flue gas along the length of the support tube.

Alternatively, each hung element has a W-shaped portion and a V-shaped portion connected thereto which together surround the support tube and cooperate with one another at adjacent ends of the hung elements to provide the collecting channel which opens toward the flow of flue gas along the length of the support tube.

In both of the embodiments disclosed immediately above, there may be provided leading and trailing plate portions connected to the first and second portions and which serve to confine the flow of flue gas and solids to a particular path to enhance collection efficiency as the flue gas and solids are conveyed through the plurality of vertical, impact type particle separators located within the CFB.

In yet another embodiment, each impact type particle separator includes a pair of vertical fluid-cooled support tubes for conveying a cooling medium therethrough. The pair of support tubes are connected to one another by a membrane or plate, the plurality of hung elements being supported from the membrane or plate. Each hung element has a pair of curved portions each adapted to receive one of the pair of support tubes.

Alternatively, each impact type particle separator includes a single vertical fluid-cooled support tube for conveying a cooling medium therethrough, the single support tube having fins. The plurality of hung elements are supported by the single support tube, each hung element having a curved portion adapted to receive the single support tube and a pair of feet which rest upon the fins to support and align the hung element with respect to the flow of flue gas.

Finally, another embodiment involves a construction wherein each impact type particle separator includes a single vertical fluid-cooled support tube for conveying a cooling medium therethrough, the support tube having fins. Here, the plurality of hung elements are H-shaped and supported by and surrounding the single support tube, each H-shaped hung element having a portion adapted to receive and engage the single support tube and fins so as to support and align the hung elements with respect to the flow of flue gas.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

DESCRIPTION OF THE PREFERRED EMBODIMENTS

As used herein, the term CFB boiler will be used to refer to CFB reactors or combustors wherein a combustion process takes place. While the present invention is directed particularly to boilers or steam generators which employ CFB combustors as the means by which the heat is produced, it is understood that the present invention can readily be employed in a different kind of CFB reactor. For example, the invention could be applied in a reactor that is employed for chemical reactions other than a combustion process, or where a gas/solids mixture from a combustion process occurring elsewhere is provided to the reactor for further processing, or where the reactor merely provides an enclosure wherein particles or solids are entrained in a gas that is not necessarily a byproduct of a combustion process. Similarly, the term U-beam is used in the following discussion for the sake of convenience, and is meant to refer broadly to any type of concave impingement members or impact type particle separators used to collect and remove particles from a particle laden flue gas. Particularly, the impact type particle separators are non-planar; they may be U-shaped, V-shaped, E-shaped, W-shaped, or any other shape as long as they have a concave or cupped surface which is presented to the oncoming flow of flue gas and entrained particles which will enable the members to collect and remove particles from the flue gas.

Figure 1:
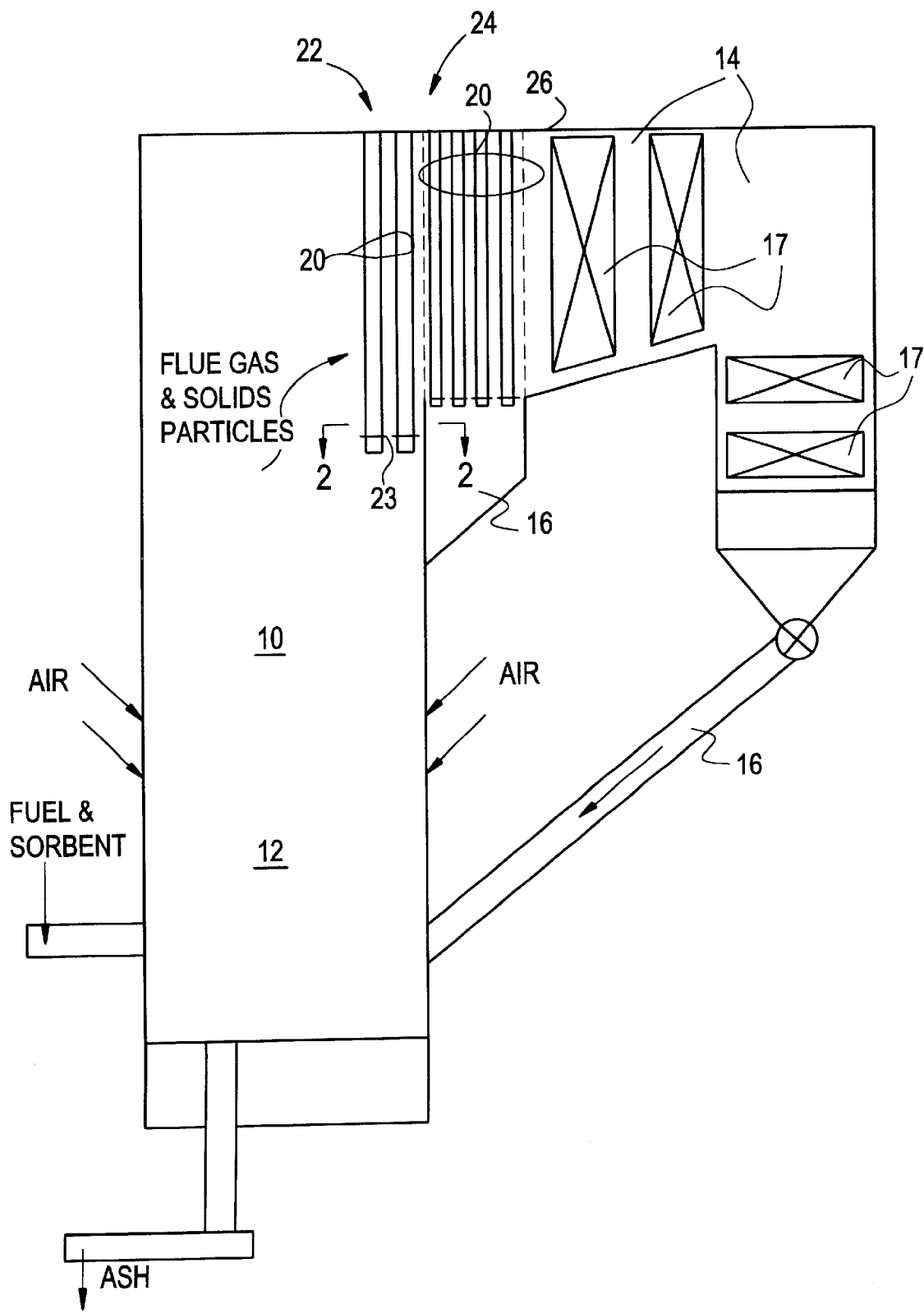
FIG. 1 is a schematic view of a known CFB boiler design employing an impact type particle separator system.

Referring now to the drawings, in which like reference numerals are used to refer to the same or functionally similar elements throughout the several drawings, FIG. 1 shows a furnace, generally designated 10, containing circulating fluidized bed 12, exhaust flue 14, and particulate return 16. Combustion of fuels occurs in circulating fluidized bed 12, generating hot waste or flue gases which are laden with particulate matter. The hot gases rise through furnace 10 to exhaust flue 14, from where the gases pass across and/or through several heat transfer surfaces (such as superheater, reheater or economizer) 17 and cleaning stages before being conveyed to the atmosphere (not shown).

Rows of staggered, impact type particle separators 20 are oriented in the upper part of furnace 10, and are generally supported from furnace roof 26. A first group of particle separators 22 is referred to as the in-funnace U-beams 22, while a second group of particle separators 24 is provided and located downstream of the furnace exit which is schematically represented by the dotted vertical line in FIG. 1 shown in between groups 22 and 24. Particulate matter entrained in flue gas strikes impact type particle separator 20, becomes separated and free-falls directly back into the circulating fluidized bed 12, where further combustion or reaction of the recycled particulate can occur. Generally, the impact type particle separators 20 are nonplanar and preferably U-shaped in cross-section, but they may be V-shaped, E-shaped, W-shaped or of some similar concave or cupped configuration.

Figure 2:
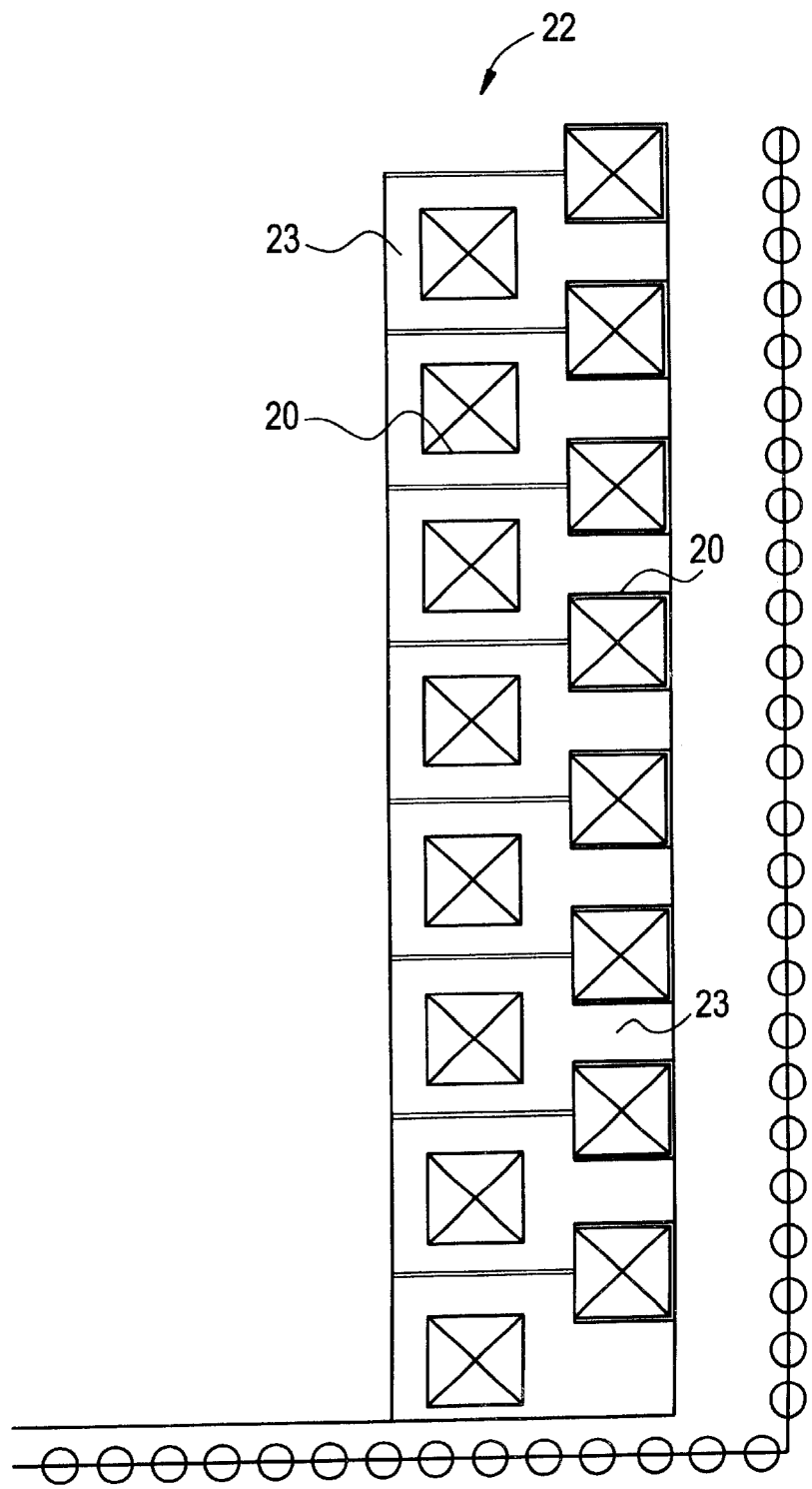
FIG. 2 is a sectional plan view of the in-furnace group of U-beams in FIG. 1, viewed in the direction of arrows 2—2.

FIG. 2 is a sectional plan view of the in-furnace U-beams 22 forming the in-furnace group 22 of U-beams 20, and illustrates how the rows of U-beams 20 are staggered with respect to one another in adjacent rows. At the bottom of each U-beam 20 in the in-furnace group 22 there is typically a plate forming a pan or baffle 23 whose purpose is to prevent the flue gases and entrained particles from bypassing the U-beams 20.

Figure 3:
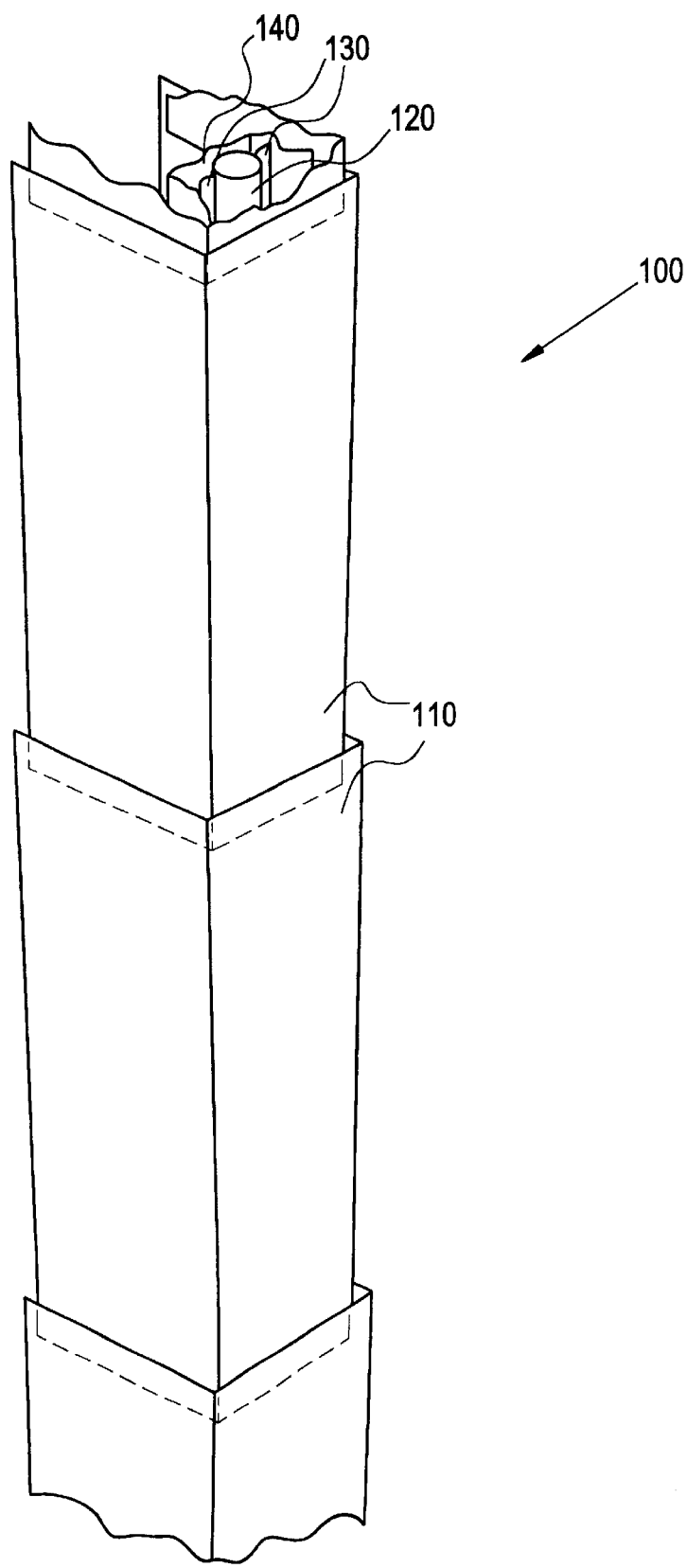
FIG. 3 is a rear perspective view of a first embodiment of an individual U-beam impact type particle separator according to the present invention.
Figure 4:
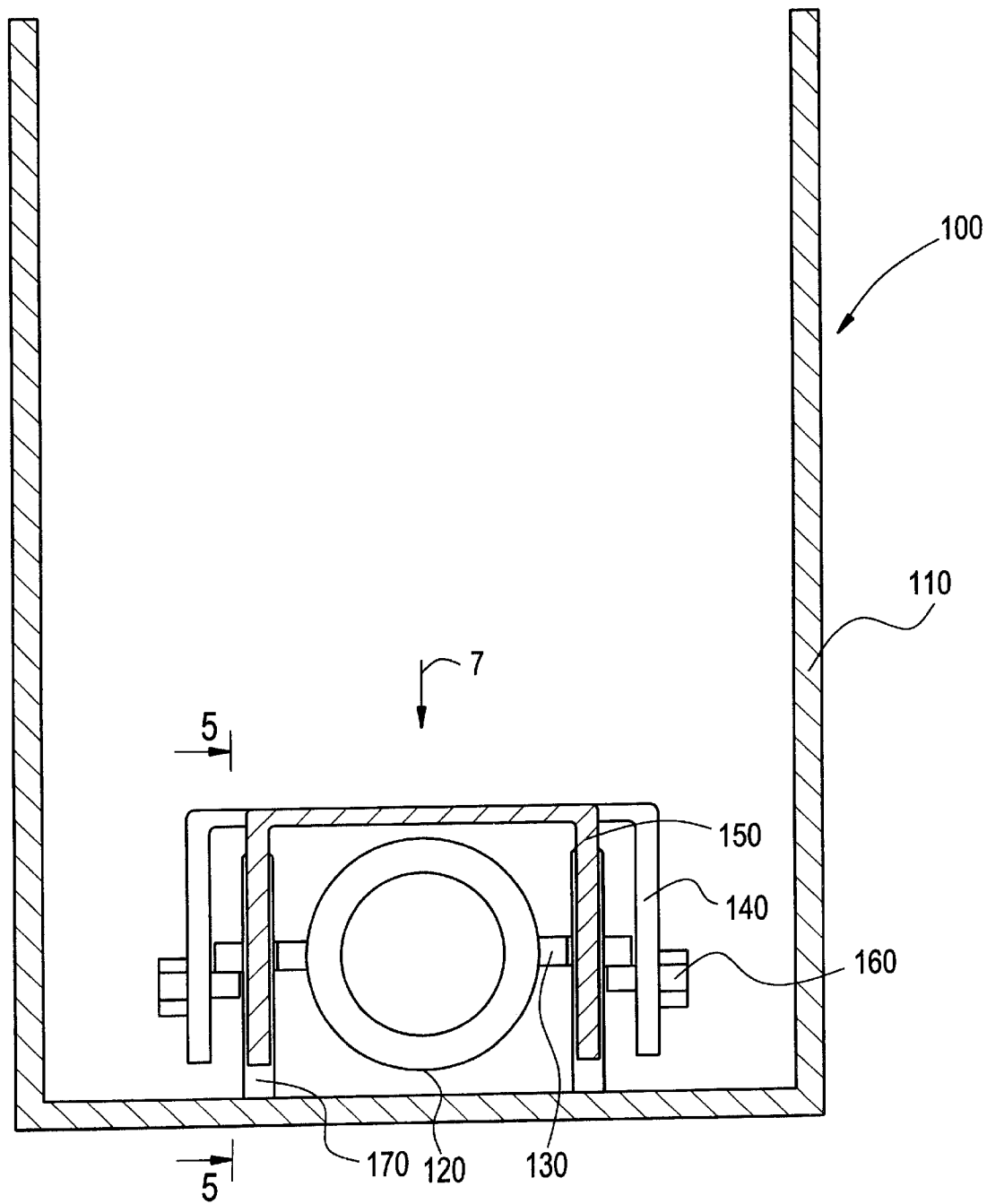
FIG. 4 is a sectional plan view of the U-beam impact type particle separator of FIG. 3.

Referring now to FIGS. 3–8 generally, and to FIG. 3 in particular, there is illustrated a first embodiment of the U-beam impact type particle separator 100 according to the present invention. Each U-beam 100 is comprised of a plurality of hung elements 110, preferably U-shaped in cross-section, which are supported from a fluid-cooled support tube 120 which may be cooled by water, steam, a mixture thereof, or some other suitable cooling medium. The cooling tubes 120, and thus the U-beams 100 of which they form a part, are arranged vertically like the known U-beams 20 illustrated in FIG. 1, and may be supported from the roof 26 of the furnace 10. On each fluid-cooled support tube 120 there is provided fins 130 which permit the hung elements 110 to be supported therefrom, preferably by means of hooks 170 (illustrated in FIGS. 4, 5, 6 and 8). The cooling tubes 120 which support the hung elements 110 forming an individual U-beam 100 are located within the interior or collecting portion of the U-beam 100. The cooling or support tubes 120 may be 2' outside diameter (OD) but other tube diameters may of course be used. Additionally, to prevent erosion of the cooling or support tubes 120, protection elements 140 preferably in the form of a C-channel or the like are provided over the front portions of the cooling or support tubes 120 as shown so that the incoming flow of flue gas and solids particles do not directly impinge upon the support tubes 120. Since in this embodiment the fluid-cooled support tube 120 and associated protection element 140 occupy a portion of the interior portion of the hung elements 110 forming the U-beam 100, the depth of the individual hung elements 110 may be increased so that collection efficiency is not impaired. Each of the protection elements 140 has at least one pair of lugs 150 formed symmetrically on its sides which interlock with the hooks 170 within notches in the fins 130 thus preventing accidental disengagement of the elements 110 from the associated fluid-cooled support tube 120. Bolts 160 secure the position of the protection elements 140 relative to the fluid-cooled support tube 120.

Figure 5:
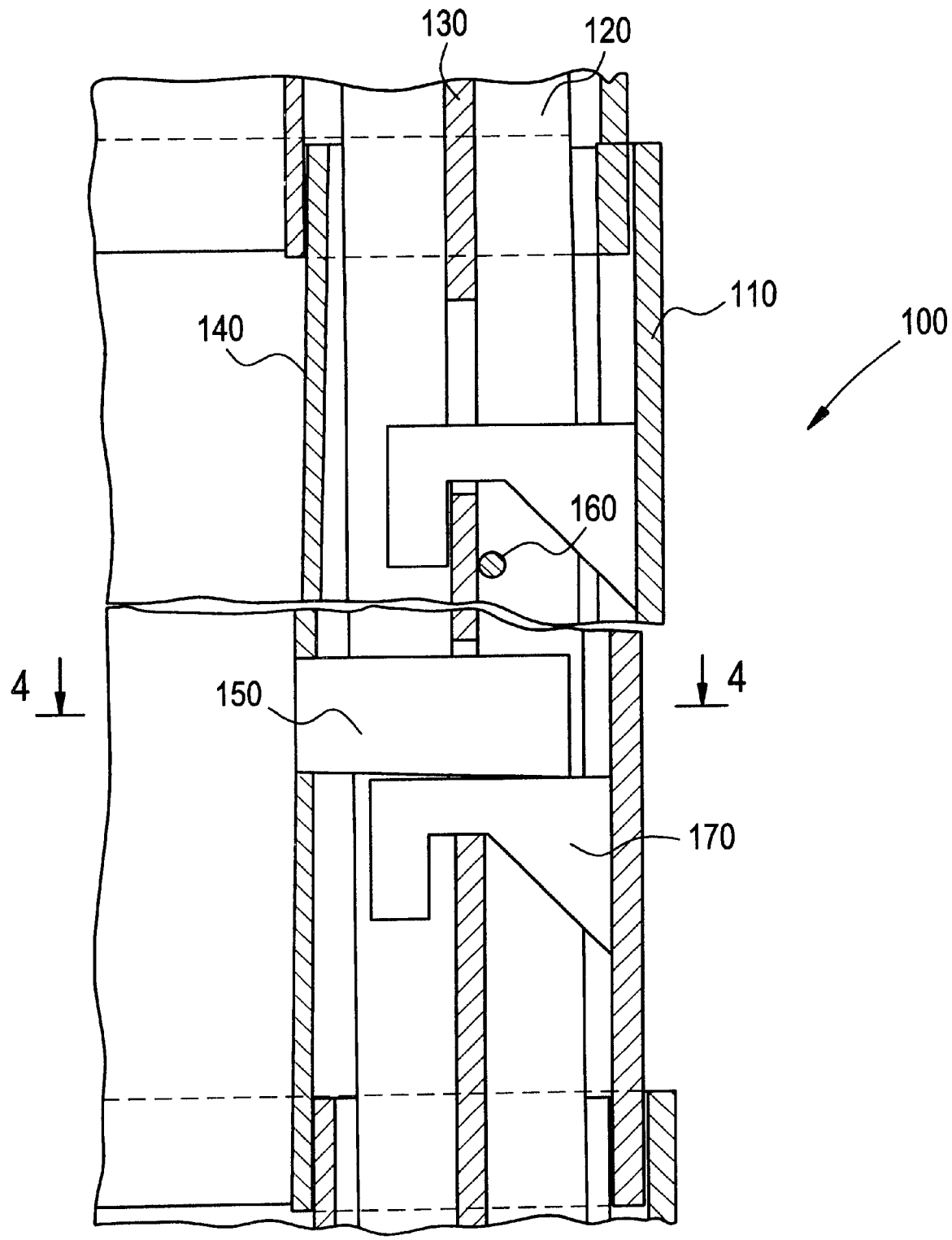
FIG. 5 is a sectional side view of the U-beam impact type particle separator of FIG. 4, viewed in the direction of arrows 5—5 of FIG. 4.
Figure 6:
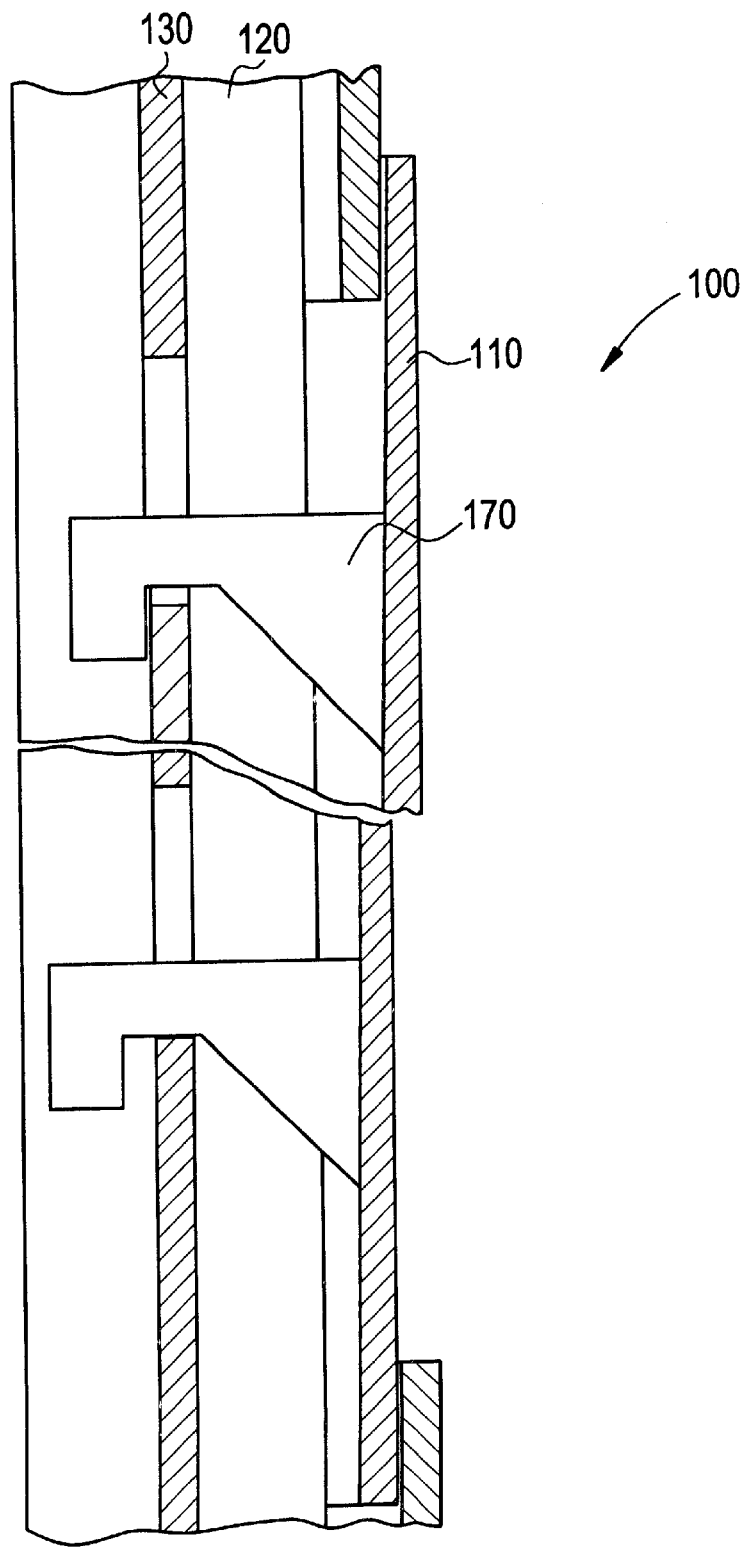
FIG. 6 is a sectional side view of the U-beam impact type particle separator of FIG. 4, viewed in the direction of arrows 5—5 of FIG. 4, with the tube protection removed for clarity.
Figure 7:
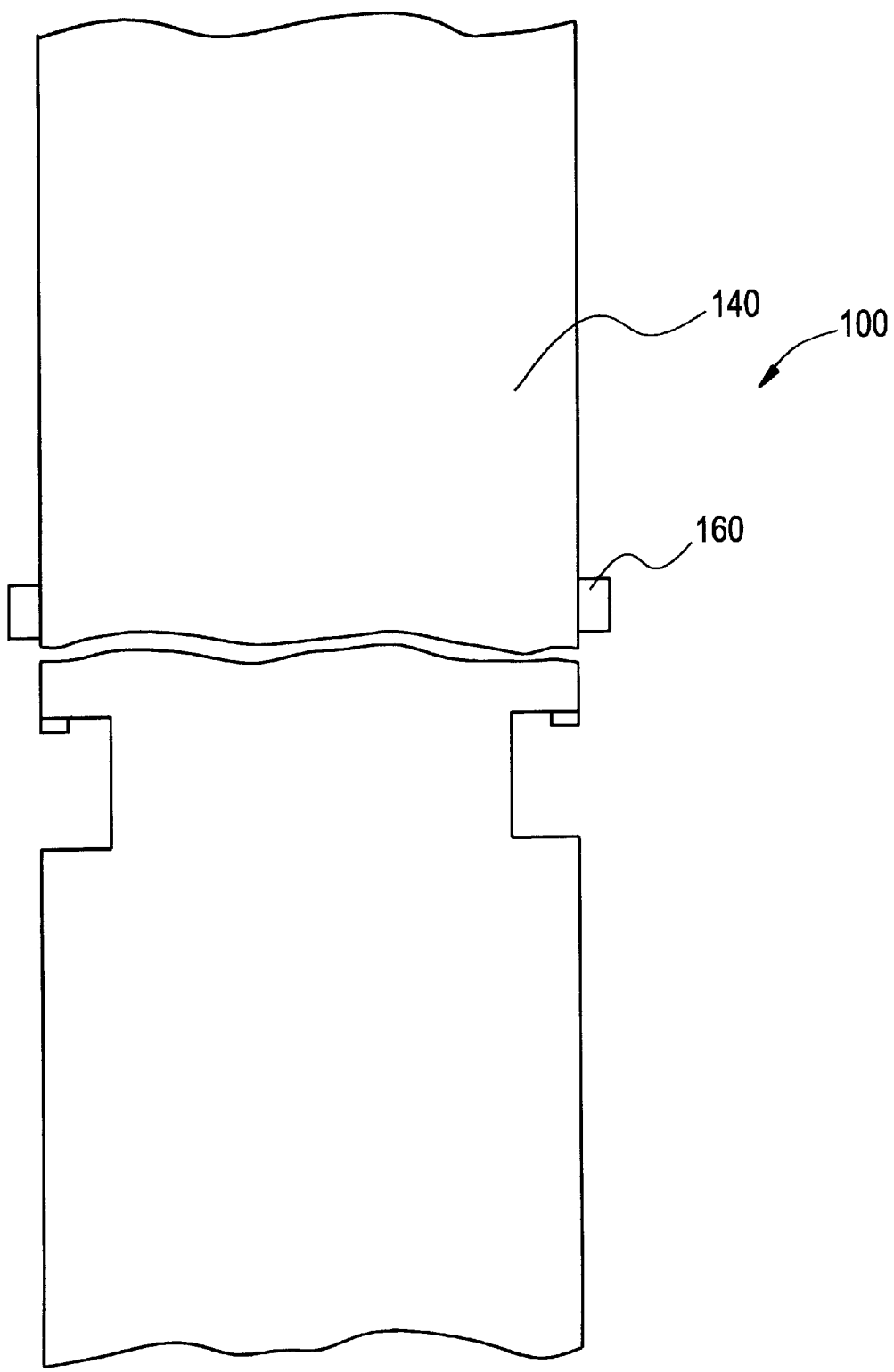
FIG. 7 is a front view of the U-beam impact type particle separator of FIG. 4, viewed in the direction of arrow 7 of FIG. 4.
Figure 8:
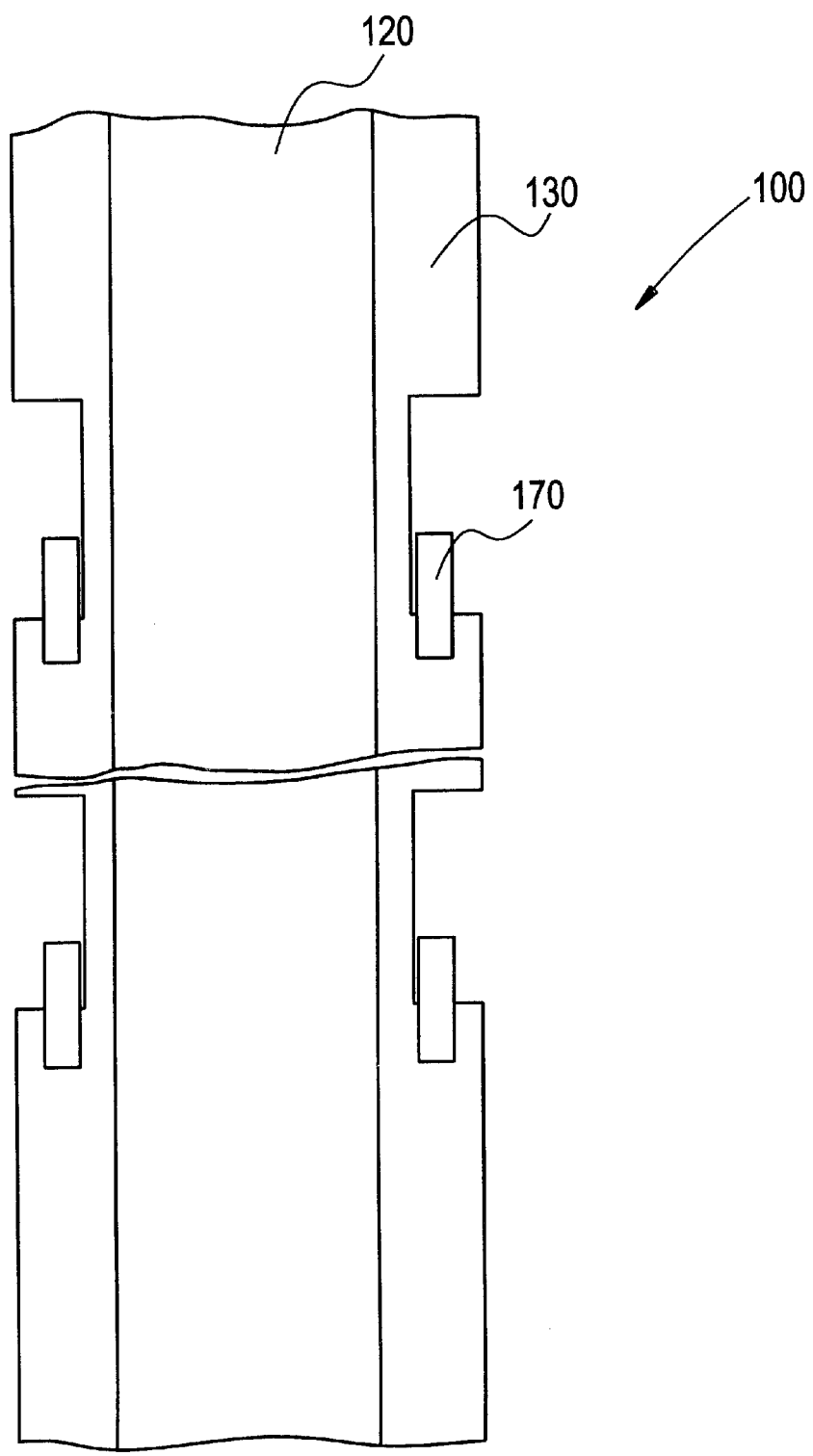
FIG. 8 is a front view of the U-beam impact type particle separator of FIG. 4, viewed in the direction of arrow 7 of FIG. 4, with the tube protection removed for clarity.

As illustrated in FIGS. 3, 5 and 6, the lower ends of each of the hung elements 110 are tapered so as to permit the adjoining hung elements 110 which are stacked one upon the other along the length of the cooling or support tubes 120 to overlap and prevent gas and solids particles from passing through each U-beam 100. Alternatively, the hung elements 110 may be substantially straight, without any tapering lower portions, and the ends of each hung element 110 may be provided with shiplap or V-groove joints or the like (not shown).

Figure 9:
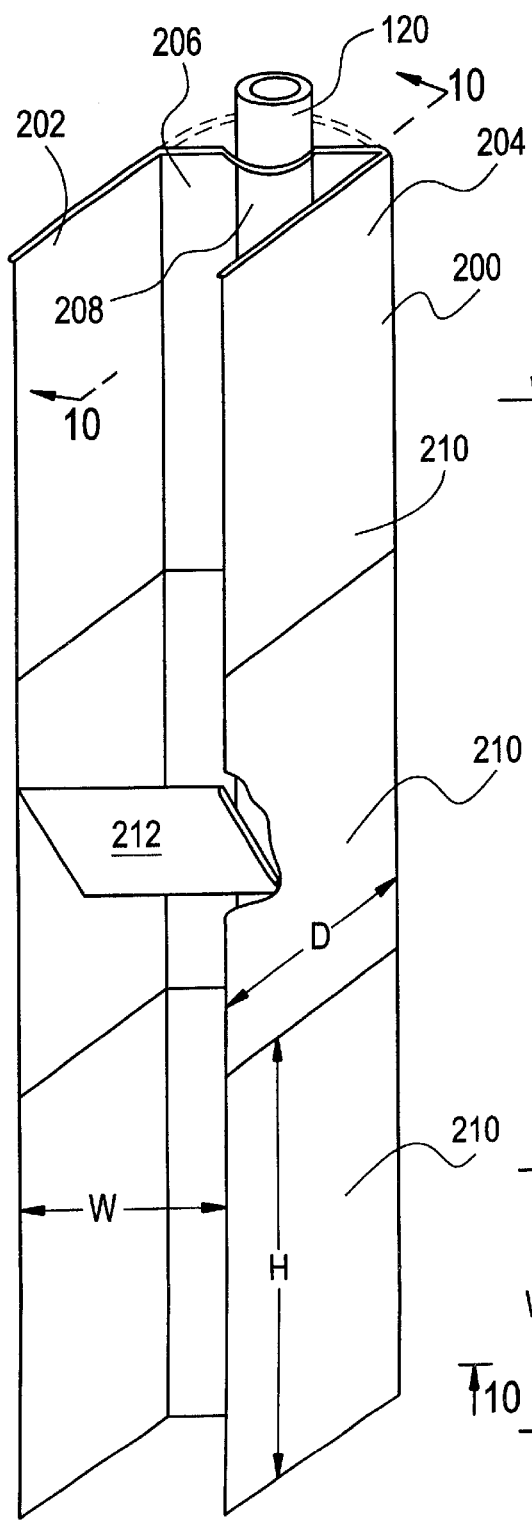
FIG. 9 is a front perspective view of a second embodiment of the U-beam impact type particle separator according to the present invention.
Figure 10:
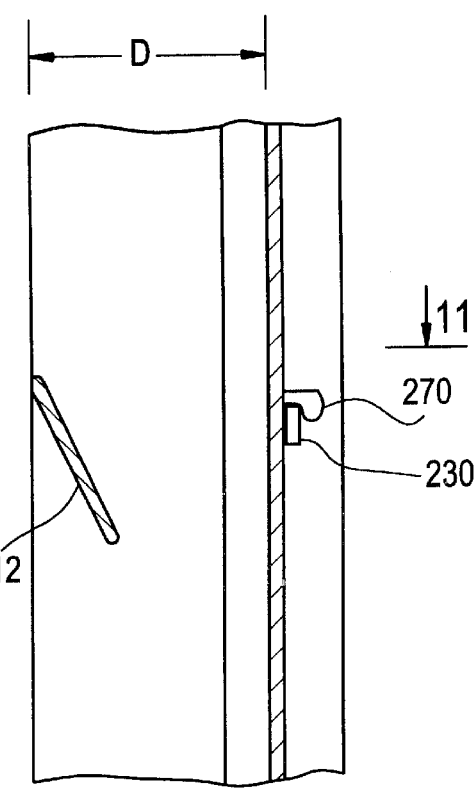
FIG. 10 is a sectional side view of FIG. 9, viewed in the direction of arrows 10—10 of FIG. 9.
Figure 11:
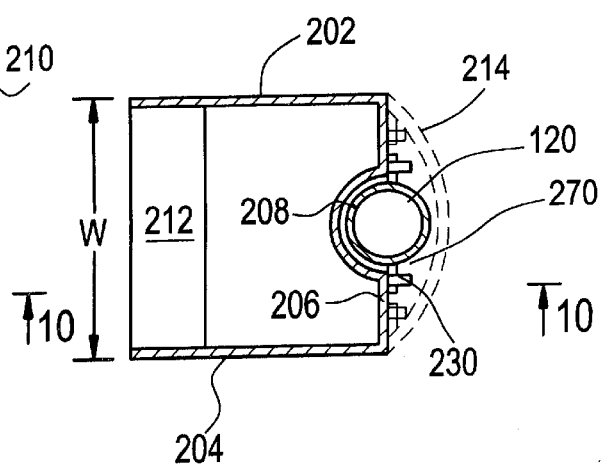
FIG. 11 is a sectional plan view of FIG. 9, viewed in the direction of arrows 11—11 of FIG. 10.

FIGS. 9–11 illustrate a second embodiment of the U-beam impact type separator elements according to the present invention, generally designated 200, which is a variation of the first embodiment illustrated in FIGS. 3–8. The primary difference between the separator elements 200 and the separator elements 100 is that the fluid-cooled support tube 120 is external of the collection portion of the separator element 200, being located on a rear portion thereof rather than within the collection portion.

As illustrated, the U-beam 200 is again made up of a plurality of individual hung elements 210, each having a left wall 202, right wall 204, and a back wall 206. The back wall 206 is provided with a curved portion 208 adapted to correspond to the outside diameter of the fluid-cooled support tube 120. Each hung element 210 has a width W, depth D and a height H. At various locations along the height of the U-beam 200 (and along the height of the U-beam 100 as well) there are advantageously provided straps or baffles 212 which serve to maintain the shape and alignment of the U-beam 200 and which may also serve (if a plate structure) to redirect falling solids back into the U-beam 200. Diametrically opposed lugs 230 are welded to the fluidcooled support tube 120 and on which hooks 270 of the hung elements 210 hang for support. If desired, a shield 214 may be provided and secured to the rear portion of the U-beam 200 to protect the fluid-cooled support tube 120 and the supporting lugs 230 and hooks 270 from erosion. Alternatively, the at least one cooling tube 120 may be provided with erosion resistant means comprising at least one of: a plurality of pin studs welded to the cooling tubes and covered with a coating of refractory; ceramic tiles; metal or ceramic spray coatings; metal or ceramic castings; and weld overlay.

Figure 12:
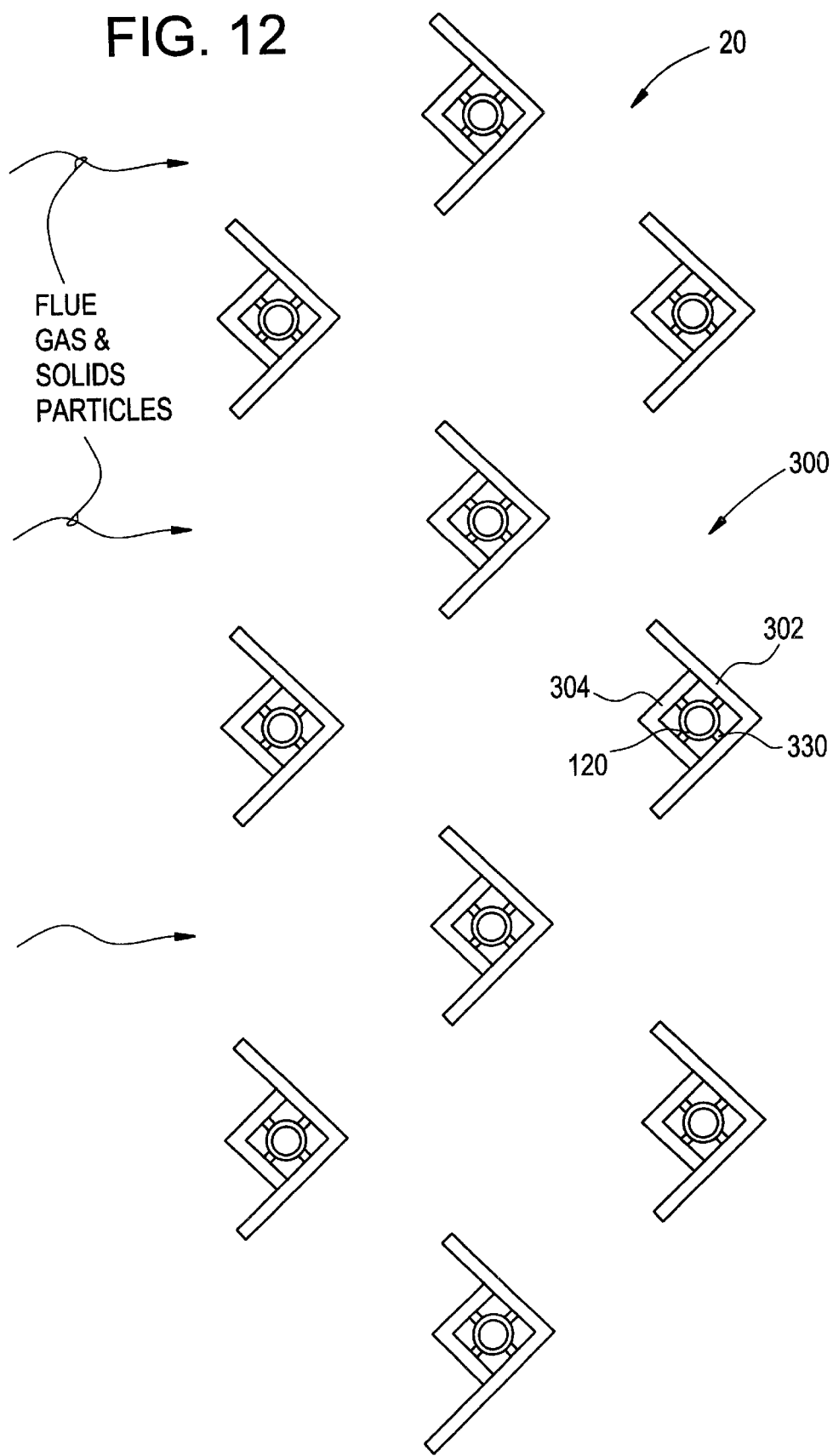
FIG. 12 is a plan view of an array of staggered, impact type particle separators according to a third embodiment of the U-beam impact type particle separator according to the present invention.

FIG. 12 illustrates a plan view of an array of staggered, impact type particle separators employing a third embodiment of the U-beam impact type particle separator, generally designated 300, according to the present invention. Each U-beam 300 is comprised of a first V-shaped portion 302 and a second V-shaped portion 304 which is connected to the to the first V-shaped portion 302. Together, they surround the fluid-cooled support tube 120 to protect it from erosion while at the same time providing a collection region which opens towards the oncoming flow of flue gas and solids particles when the CFB is in operation.

In the case shown, the first V-shaped portion 302 opens toward the oncoming flow of flue gas and solids particles when the CFB is in operation. Standoff lugs 330 are provided on the fluid-cooled support tube 120 to secure the U-beam 300 thereto while maintaining a desired separation distance between the hung elements comprising the U-beam 300 and the fluid cooled support tube 120. This might be done for temperature control considerations. A plurality of such hung elements each having a shape as shown would be provided along the length of the fluid-cooled support tube 120 to create the U-beam impact type particle separator 300.

Figure 13:
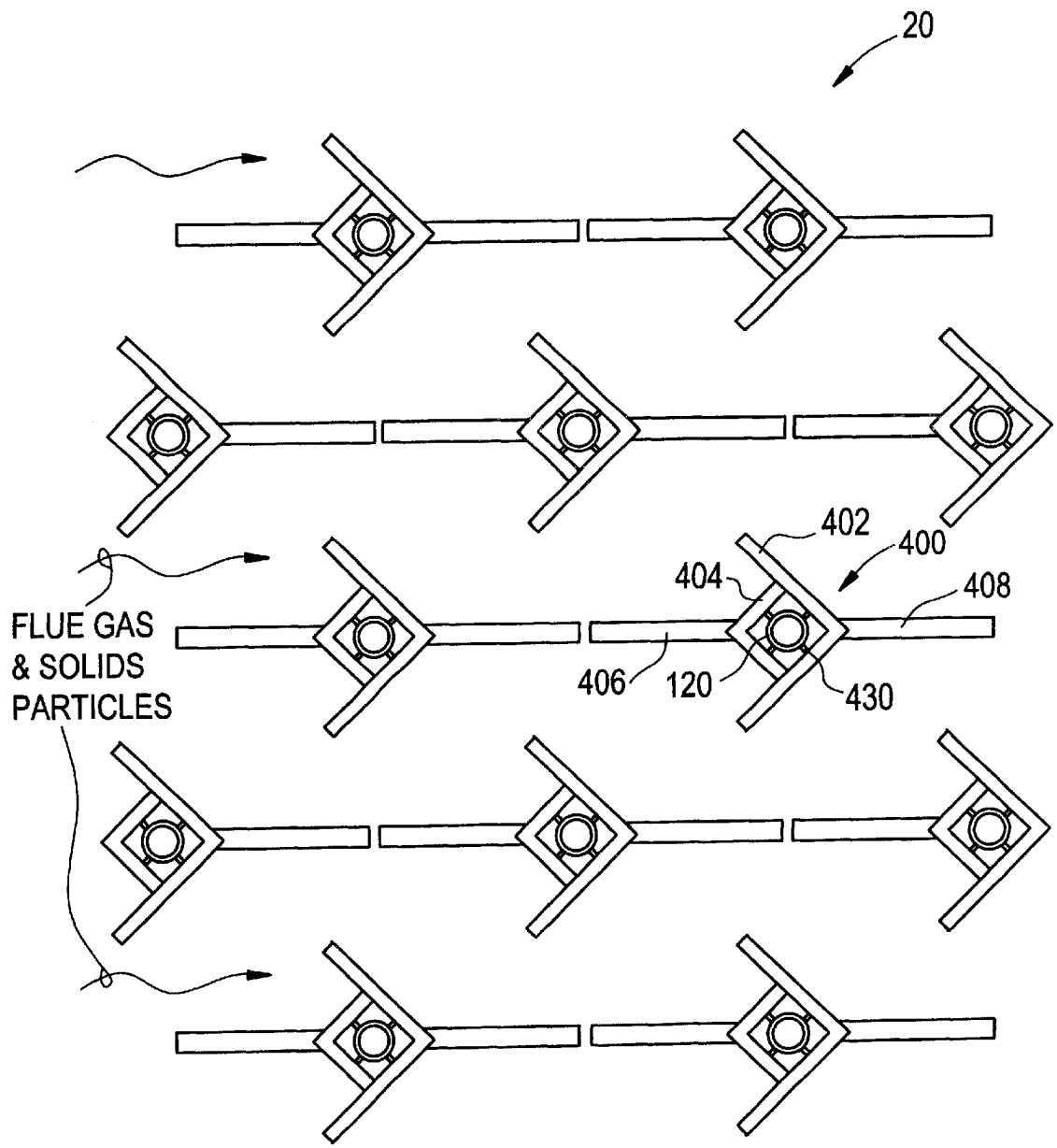
FIG. 13 is a plan view of an array of staggered, impact type particle separators according to a fourth embodiment the U-beam impact type particle separator according to the present invention.

FIG. 13 illustrates a plan view of an array of staggered, impact type particle separators according to a fourth embodiment of the U-beam impact type particle separator, generally designated 400. Again, first and second V-shaped portions 402, 404, respectively, are provided around the fluid-cooled support tube 120, connected to one another as before preferably by welding. It is understood, however, that the U-beam 400, as well as the U-beam 300, may be manufactured as a single piece having both the first and second V-shaped portions. Standoff lugs 430 are provided as in the case of U-beam 300. The U-beam 400 differs from U-beam 300 in that there is also provided leading 406 and trailing 408 plate portions connected to the first and second V-shaped portions which serve to confine the flow of flue gas and solids particles to a particular path to enhance collection efficiency as they are conveyed through the array of separators or U-beams 400.

Figure 14:
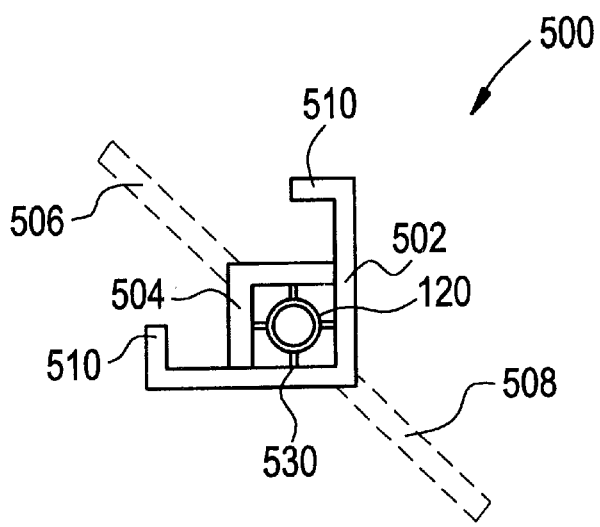
FIGS. 14, 15 and 16 are sectional plan views of variations (fifth, sixth and seventh embodiments) of an individual U-beam impact type particle separator according to the present invention.
Figure 15:
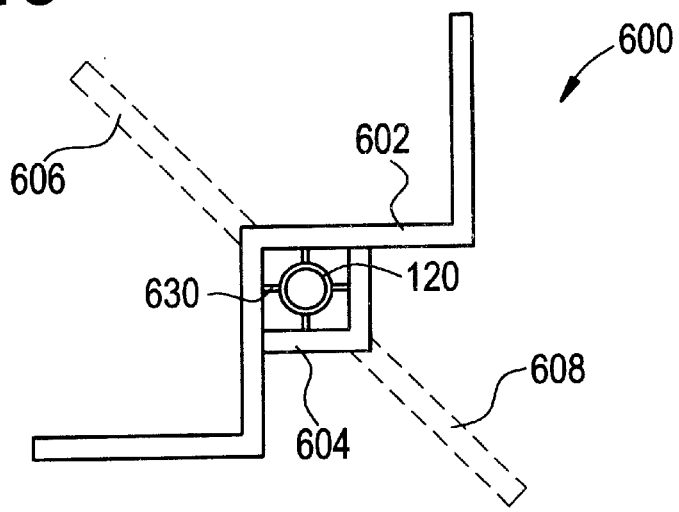
Figure 16:
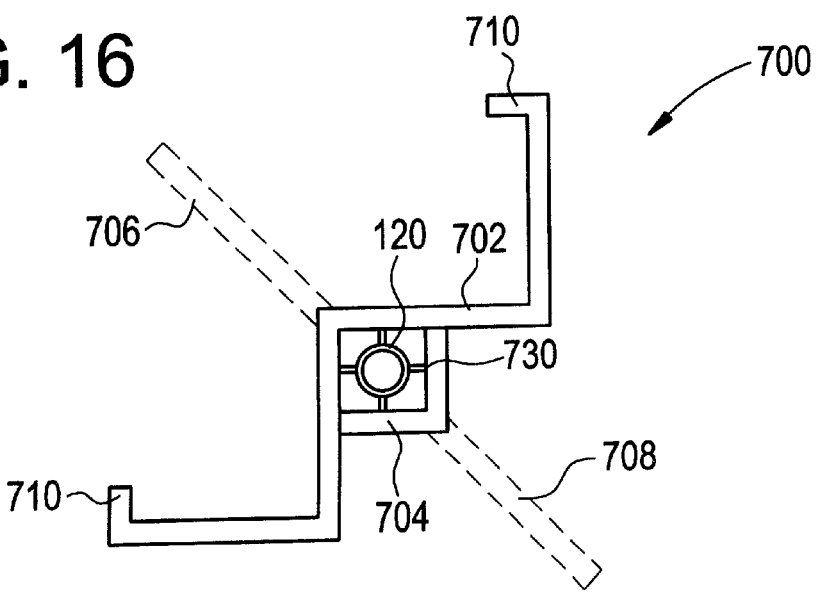

FIGS. 14, 15 and 16 illustrate sectional plan views of fifth, sixth and seventh embodiments of an individual U-beam impact type particle separator, designated 500, 600 and 700, respectively. The differences between the earlier U-beams 300 and 400 will be readily apparent upon a review of the FIGS. In FIG. 14, there are provided lip portions 510 on the distal ends of the first V-shaped portion 502. Support lugs 530 support the first 502 and second 504 V-shaped portions in a similar fashion as before. Leading and trailing plate portions 506, 508 connected to the first and second V-shaped portions may optionally be provided as well. In FIG. 15, instead of a first V-shaped portion, there is provided a W-shaped portion 602, connected to a V-shaped portion 604 which cooperates to surround the fluid-cooled support tube 120 as before. Support lugs 630 support the W-shaped 602 and V-shaped 604 portions as before. Finally, in FIG. 16, it will be seen that the U-beam 700 configuration and function is substantially the same as that of U-beam 600, with the addition of lip portions 710 as illustrated in FIG. 14. In both FIGS. 15 and 16, the leading and trailing plate portions (606,608 and 706, 708, respectively) connected to the W- and V-shaped portions may again be optionally employed if desired. In all of FIGS. 14–16, multiple segments having the illustrated configurations would be provided and hung along the vertical length of the fluid-cooled support tubes 120 to form the respective U-beam impact type particle separators.

Figure 17:
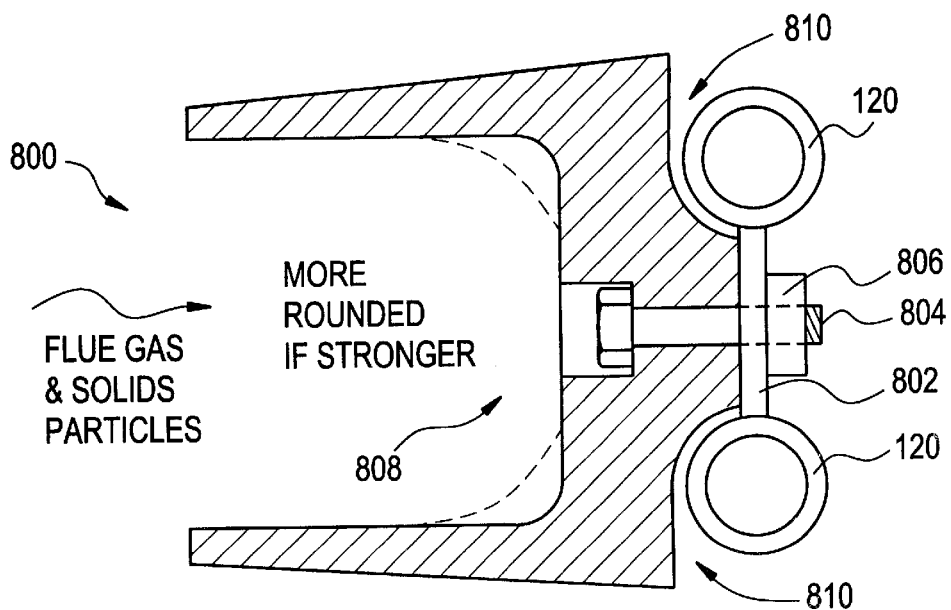
FIGS. 17 and 18 are sectional plan views of an eighth embodiment of an individual U-beam impact type particle separator according to the present invention.
Figure 18:
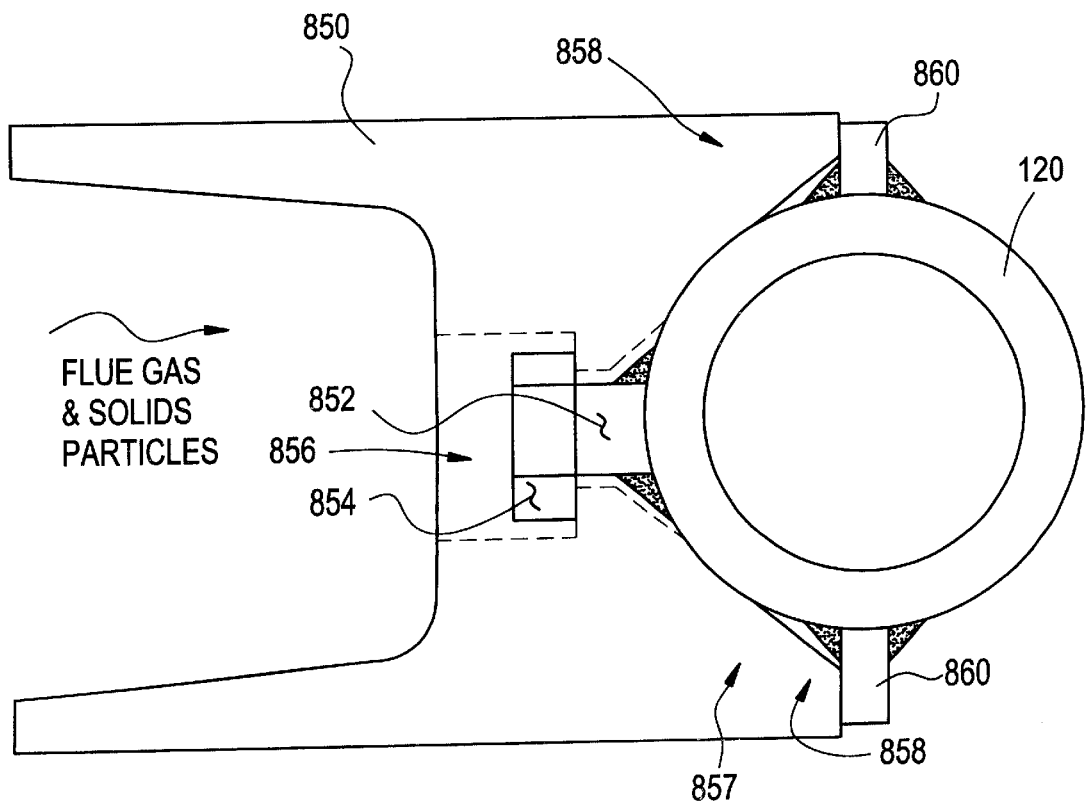

FIGS. 17 and 18 illustrate sectional plan views of an eighth embodiment of an individual U-beam impact type particle separator according to the present invention. In FIG. 17, each of the plurality of individual hung elements forming the U-beam, generally designated 800, is hung in front of and from a membrane or plate 802 connected between a pair of fluid-cooled support tubes 120 located at the rear of the hung element 800. A bolt 804 and nut 806 may be used to attach each element 800. After assembly, the front portion at 808 would be filled such as by plug welding or by filling with erosion resistant refractory. To accommodate the pair of fluid-cooled tubes 120, the rear portion of each individual U-beam hung element 800 is provided with a curved portion 810 adapted to correspond to the outside diameter of the fluid-cooled support tube 120. Alternatively, as illustrated in FIG. 18, a single fluid-cooled support tube 120 may support the individual hung elements forming the U-beam 850. A threaded stud 852 welded to the crown of the fluid-cooled support tube 120 and a nut 854 would suffice; again the front portion at 856 would be filled to prevent erosion of these fasteners. A curved portion 857 on the rear portion of the U-beam hung element 850 again receives the fluid-cooled support tube 120, while feet 858 rest upon fins or plate 860 to keep the U-beam hung element 850 supported, stable and properly aligned with respect to the oncoming flow of flue gas and solids particles. Either element 800 or 850 is advantageously a ceramic casting, roughly 6–9' high, and ship-lapped or V-grooved vertically to prevent particle leakage through the U-beams.

Figure 19:
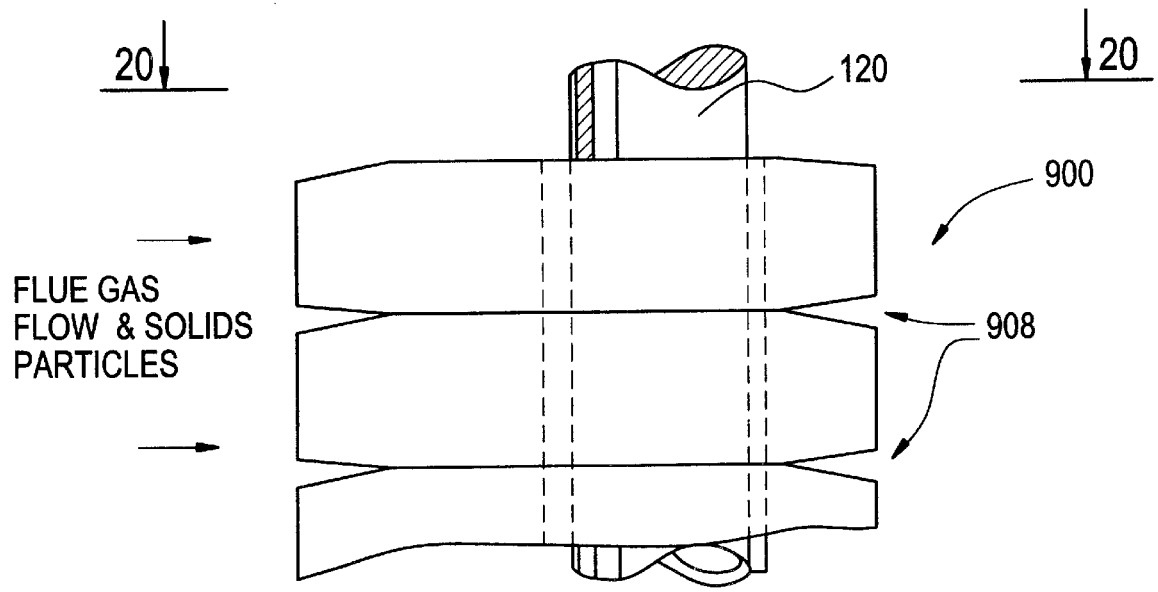
FIG. 19 is a side view of a ninth embodiment of an individual U-beam impact type particle separator according to the present invention.
Figure 20:
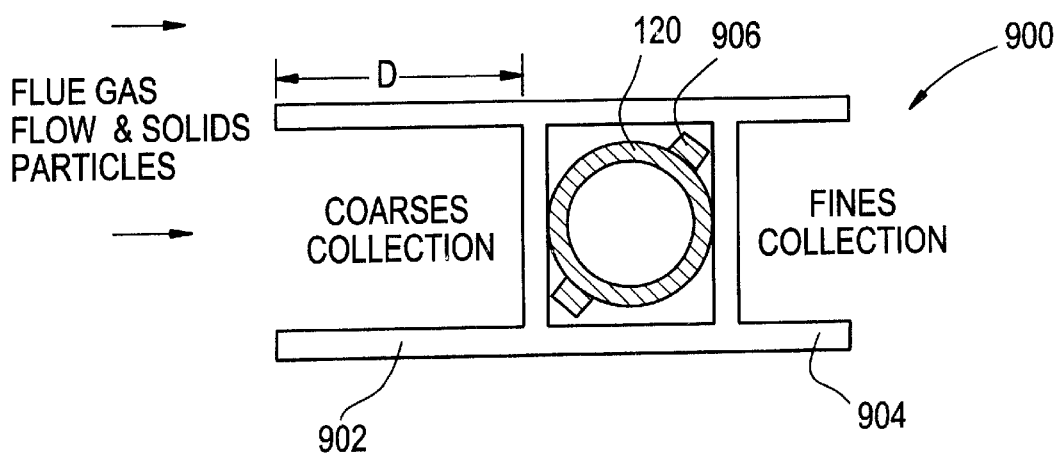
FIG. 20 is a sectional plan view of FIG. 19 viewed in the direction of arrow 20 of FIG. 19.

Finally, FIGS. 19 and 20 illustrate a ninth embodiment of an individual U-beam impact type particle separator, generally designated 900. Here, the U-beam hung elements are provided with an H-shape in cross-section, and a leading portion 902. Field observations of erosion patterns of other conventional U-beam constructions indicate that a trailing portion may actually collect particles, and thus a trailing portion 904 is also provided. The depth D of the leading portion 902 is generally greater than that of the trailing portion 904, however.

The fluid-cooled support tubes 120 are advantageously provided with fins or membrane 906 sufficient to support and align the H-shaped U-beam elements 900. Again, a complete U-beam 900 would be comprised of a plurality of stacked individual hung elements along the length of the support tubes 120. As illustrated in FIG. 19, the extreme ends of the leading and trailing portions 902, 904 are obliquely slotted as shown at 908 to allow for thermal expansion.

The fluid-cooled support tubes 120 employed in any of the aforementioned embodiments thus provide a cooled support as well as alignment and cooling of the plurality of hung elements comprising an individual U-beam impact type particle separator.

Each hung element in the various embodiments may be comprised of alloy metal, ceramic or other materials having high heat resistance. They may comprise a single unitary piece or made of separate pieces, and may be castings or extrusions as dictated by functional or economic considerations.

While specific embodiments of the invention have been shown and described in detail to illustrate the application of the principles of the invention, those skilled in the art will appreciate that changes may be made in the form of the invention covered by the following claims without departing from such principles. For example, the present invention may be applied to new construction involving circulating fluidized bed reactors or combustors, or to the replacement, repair or modification of existing circulating fluidized bed reactors or combustors. In some embodiments of the invention, certain features of the invention may sometimes be used to advantage without a corresponding use of the other features. Accordingly, all such changes and embodiments properly fall within the scope of the following claims.

We claim:

1. An apparatus for separating solids from a flow of flue gas in a circulating fluidized bed (CFB) boiler, comprising:
a plurality of vertical, impact type particle separators located within the CFB, the impact type particle separators being adjacently positioned and horizontally spaced from one another in a plurality of staggered rows, each impact type particle separator including at least one vertical fluid-cooled support tube for conveying a cooling medium therethrough and a plurality of hung elements which are supported from the at least one support tube, the plurality of hung elements cooperating with one another at adjacent ends thereof to form a collecting channel which opens toward the flow of flue gas along the length of the support tube.

2. The apparatus according to claim 1, wherein each support tube has fins and the hung elements are U-shaped having side walls and a back wall and are supported by hooks attached thereto which engage the fins from a rear side of the support tube, each support tube being located within the U-shaped portion of the hung elements, and a C-channel having interlocking portions which engage the fins from a front side of the support tube, the C-channel covering the support tube to prevent erosion thereof by solids collected by the impact type particle separator when the CFB boiler is in operation.

3. The apparatus according to claim 1, wherein the hung elements are tapered and the adjacent ends of the plurality of hung elements overlap one another.

4. The apparatus according to claim 1, wherein the adjacent ends of the plurality of hung elements meet at one of shiplap and V-groove joints.

5. The apparatus according to claim 1, wherein the plurality of hung elements are made of one of metal and ceramic.

6. The apparatus according to claim 1, wherein the plurality of hung elements are provided with straps to maintain their shape and alignment.

7. The apparatus according to claim 1, wherein the plurality of hung elements are provided with baffles to maintain their shape and alignment and to redirect falling solids back into the collecting channel.

8. The apparatus according to claim 1, wherein each of the support tubes is provided with at least one of: a plurality of pin studs welded to the support tube and covered with a coating of refractory; ceramic tiles; metal or ceramic spray coatings; metal or ceramic castings; weld overlay; and shields.

9. The apparatus according to claim 1, wherein each of the support tubes has fins and the hung elements are U-shaped and supported by hooks which engage the fins from a front side of the support tube, the plurality of hung elements cooperating with one another at adjacent ends thereof to form the collecting channel which opens toward the flow of flue gas along the length of the support tube, the collecting channel having side walls and a back wall, the back wall having a curved portion adapted to correspond to an outside diameter of the support tube, the support tube being located outside of the U-shaped portion of the hung elements.

10. The apparatus according to claim 1, wherein each hung element has a first V-shaped portion and a second V-shaped portion connected thereto which together surround the support tube and cooperate with one another at adjacent ends of the hung elements to provide the collecting channel which opens toward the flow of flue gas along the length of the support tube.

11. The apparatus according to claim 1, wherein each hung element has a W-shaped portion and a V-shaped portion connected thereto which together surround the support tube and cooperate with one another at adjacent ends of the hung elements to provide the collecting channel which opens toward the flow of flue gas along the length of the support tube.

12. The apparatus according to claim 10 or 11, comprising leading and trailing plate portions connected to the first and second portions and which serve to confine the flow of flue gas and solids to a particular path to enhance collection efficiency as the flue gas and solids are conveyed through the plurality of vertical, impact type particle separators located within the CFB.

13. The apparatus according to claim 10, comprising lip portions on distal ends of the first V-shaped portion.

14. The apparatus according to claim 11, comprising lip portions on distal ends of the W-shaped portion.

15. The apparatus according to claim 1, wherein each impact type particle separator includes a pair of vertical fluid-cooled support tubes for conveying a cooling medium therethrough, the pair of support tubes connected to one another by a membrane or plate, the plurality of hung elements being supported from the membrane or plate, each hung element having a pair of curved portions each adapted to receive one of the pair of support tubes.

16. The apparatus according to claim 1, wherein each impact type particle separator includes a single vertical fluid-cooled support tube for conveying a cooling medium therethrough, the single support tube having fins, the plurality of hung elements being supported by the single support tube, each hung element having a curved portion adapted to receive the single support tube and a pair of feet which rest upon the fins to support and align the hung element with respect to the flow of flue gas.

17. The apparatus according to claim 1, wherein each impact type particle separator includes a single vertical fluid-cooled support tube for conveying a cooling medium therethrough, the support tube having fins, the plurality of hung elements being H-shaped and supported by and surrounding the single support tube, each H-shaped hung element having a portion adapted to receive and engage the single support tube and fins so as to support and align the hung elements with respect to the flow of flue gas.

* * * * *